United States Patent

[11] 3,596,876

| [72] | Inventor | Domer Scaramucci<br>3245 S. Hattie, Oklahoma City, Okla.<br>73129 |
|---|---|---|
| [21] | Appl. No. | 840,989 |
| [22] | Filed | July 11, 1969 |
| [45] | Patented | Aug. 3, 1971<br>Continuation-in-part of application Ser. No.<br>823,378, May 9, 1969. |

[54] DISC VALVE WITH UPSTREAM AND DOWNSTREAM SEATS
16 Claims, 10 Drawing Figs.

[52] U.S. Cl. .................................................. 251/306,
251/308, 251/315, 251/151
[51] Int. Cl. ..................................................... F16k 1/22,
F16k 5/06
[50] Field of Search .......................................... 251/148,
151, 152, 305, 306, 308, 315

[56] References Cited
UNITED STATES PATENTS

| 2,936,778 | 5/1960 | Stillwagon ...................... | 251/306 X |
| 3,186,682 | 6/1965 | Pierson et al. .................. | 251/306 |
| 3,476,356 | 11/1969 | Scaramucci ...................... | 251/151 |
| 3,486,736 | 12/1969 | Scaramucci ...................... | 251/315 |

FOREIGN PATENTS

| 70,924 | 11/1942 | Czechoslovakia ............ | 251/305 |
| 1,459,171 | 10/1966 | France .......................... | 251/305 |
| 1,506,249 | 11/1967 | France .......................... | 251/305 |
| 1,006,377 | 9/1965 | Great Britain ................ | 251/306 |

*Primary Examiner*—William R. Cline
*Attorney*—Dunlap, Laney, Hessin & Dougherty

ABSTRACT: Improved seats for use with a disc valve having seating surfaces on both ends of the disc mating with upstream and downstream seats.

Patented Aug. 3, 1971

INVENTOR
DOMER SCARAMUCCI

BY
Dunlap, Laney, Hessin & Dougherty
ATTORNEYS

Patented Aug. 3, 1971

INVENTOR
DOMER SCARAMUCCI

BY
Dunlap, Laney, Hessin & Dougherty
ATTORNEYS

INVENTOR
DOMER SCARAMUCCI 3,596,876

DISC VALVE WITH UPSTREAM AND DOWNSTREAM SEATS

CROSS REFERENCE TO RELATED APPLICATION

This application is a continuation-in-part of applicants copending application entitled, "Disc Valve With Upstream and Downstream Seats," Ser. No. 823,378, filed May 9, 1969.

BACKGROUND OF INVENTION

1. Field of Invention

This invention relates generally to improvements in disc valve assemblies, and more particularly, but not by ways of limitation, to improved seats for use with a disc valve having an upstream and a downstream seat.

2. Description of the Prior Art

In applicant's above-mentioned copending application, there was disclosed a disc valve member particularly adapted to cooperate with upstream and downstream seat members to provide a positive double sealing feature normally utilized in ball-type valves. The advantages of this type construction, such as reduced valve body diameter and valve body length, were also described therein.

The seat assemblies shown therein did cooperate with the disc valve member to provide the advantages noted above. However, there are applications where it is desirable to reduce the amount of fluid contact with the valve housing, such as in those applications involving the handling of corrosive fluids. It would be desirable in those applications to have an upstream and downstream seat assembly which would also effectively provide fluidtight sealing about the valve stems, and also cooperate with each other to provide a fluidtight seal therebetween, thus isolating the valve body. Of course, it would still be desirable to have the upstream and downstream seats so adapted that they could be axially inserted for quick, easy repair or replacement.

SUMMARY OF INVENTION

The present invention basically contemplates a disc valve having a valve body, upstream and downstream seats, and a disc valve member. The valve body has upstream and downstream end faces and a bore extending therethrough. A first valve stem is journaled in the valve body and extends at a right angle to the axis of the bore through the valve body. The annular upstream seat, has a valve member end, a nonvalve member end, and inner and outer peripheries, and is adapted to be inserted axially into the bore of the valve body and supported thereby. A sealing surface is formed around a portion of the inner periphery of the upstream seat, upstream of the first valve stem, and a portion of the valve member end of the upstream seat is shaped to sealingly engage a portion of the first valve stem. The annular downstream seat has a valve member end, a nonvalve member end, and inner and outer peripheries, and is adapted to be inserted axially into the bore of the valve body and supported thereby. The downstream seat has a sealing surface formed around a portion of the inner periphery thereof, downstream of the first valve stem, and a portion of the valve member end thereof is shaped to cooperate with the upstream seat to encompass and sealingly engage the first valve stem. The downstream seat is sized to extend a distance into the bore of the valve body such that the valve member end thereof sealingly engages the valve member end of the upstream seat about the entire periphery thereof.

The disc valve member is rotatably disposed in the valve body, and is connected to the first valve stem for turning movement of the disc valve member about a turning axis, between a closed position transverse to the axis of the bore through the valve body, and an open position in line with the bore through the valve body. The axial length of the disc valve member is less than the diameter thereof. The disc valve member has seating surfaces formed on the opposite ends thereof on opposite sides of the connection of the disc valve member to the first stem, arranged to cooperate with the upstream and downstream seats when the disc valve member turned to a position transverse to the axis of the bore through the valve body, both of the seating surfaces are shaped to conform to portions of a sphere having its center in the center of the disc valve member.

An object of the invention is to provide a disc valve assembly having upstream and downstream seats which are inserted axially in the valve body, and adapted to provide a sealing engagement with the valve stems.

Another object of the invention is to provide a disc valve assembly having upstream and downstream seats which are adapted to cooperate with each other to provide a fluidtight seal therebetween, thereby substantially reducing the fluid contact with the valve body.

A further object of the invention is to provide an economically constructed disc-type valve useful in high pressure service and particularly suited for handling corrosive fluids.

Other objects and advantages of the invention will be evident from the following detailed description when read in conjunction with the accompanying drawings which illustrate various embodiments of the invention.

BRIEF DESCRIPTION OF THE DRAWINGS

FIG. 5 is a view similar to FIG. 2, but showing other modified upstream and downstream seat assemblies.

BRIEF DESCRIPTION OF THE PREFERRED EMBODIMENTS

Figure 1:
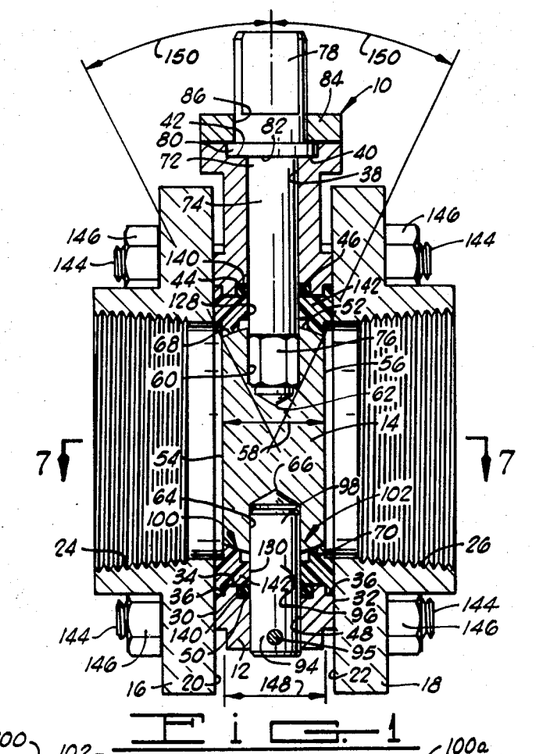
FIG. 1 is a sectional view of a valve constructed in accordance with the invention assembled between two flanges.
Figure 2:
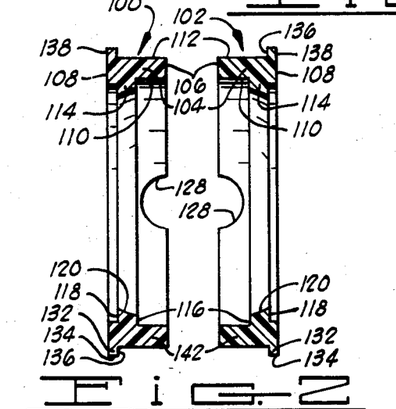
FIG. 2 is an enlarged sectional view of the upstream and downstream seat assemblies of the valve of FIG. 1, shown in a nonassembled position.

Referring to the drawings in detail, and to FIGS. 1 and 2 in particular, shown therein and designated by the general reference character 10, is a disc valve assembly basically comprising a valve body 12 having a disc valve member 14 rotatably disposed therein. The valve assembly 10 is disposed generally between a pair of flanges 16 and 18. Each of the flanges 16 and 18 includes an end face 20 or 22, and a threaded opening 24 or 26 therethrough, respectively. The threaded openings 24 and 26 are axially aligned and sized to receive the threaded ends of adjacent sections of a conduit (not shown).

The valve body 12 has upstream and downstream end faces 30 and 32, respectively, and a bore 34 extending therethrough. A counterbore 36 is formed in each end of the valve body 12, intersecting the respective end face 30 or 32 thereof.

An aperture 38 extends transversely through the valve body 12 intersecting the bore 34 therein. A counterbore 40 is formed in the aperture 38 adjacent the other end thereof, thereby providing an upwardly facing surface 42 in the valve body 12. A second counterbore 44 is formed in the aperture 38 adjacent the intersection of the aperture 38 with the bore 34, thereby providing a downwardly facing surface 46 in the valve body 12.

A second aperture 48 extends transversely through the valve body 12 intersecting the bore 34 therein. In a preferred form and as shown in FIG. 1, the second aperture 48 is radially aligned with the aperture 38, for reasons which will be made apparent below. A counterbore 50 is formed in the aperture 48 adjacent the intersection thereof with the bore 34 in the valve body 12.

The disc valve member 14 is rotatably disposed in the bore 34 of the valve body 12, and is constructed of a rigid material. The disc valve member 14 has an outer periphery 52, upstream and downstream end faces 54 and 56, respectively, and an axial length 58. The axial length 58 of the disc valve member 14 is the axial distance between the upstream end face 54 and the downstream end face 56, as measured generally adjacent the outer periphery 52. The axial length 58 is less than the diameter of the disc valve member 14, and is sized to enable the disc valve member 14 to cooperate with the upstream and downstream seal assemblies to provide a fluidtight seal as will be described in more detail below.

A recess 60 is formed in the outer periphery 52 of the disc valve member 14, and extends a distance diametrically through the disc valve member 14, terminating with an end point or apex 62, generally between the end faces 54 and 56 thereof. The recess 60 has a generally hexagonally shaped cross section, and is adapted to receive a portion of the valve stem, and to provide the interconnection between the disc valve member 14 and the valve stem as will be described in more detail below.

A second recess 64 is formed in the outer periphery 52 of the disc valve member 14, and extends a distance diametrically therethrough terminating with an end point or apex 66 therein. As shown in FIG. 1, the second recess 64 is radially aligned with the recess 60 in the disc valve member 14.

An upstream seating surface 68 is formed on a portion of the outer periphery 52 and a portion of the upstream end face 54 of the disc valve member 14. A downstream seating surface 70 is formed on a portion of the outer periphery 52 and a portion of the downstream end face 56 of the disc valve member 14. In a preferred form, the seating surfaces 68 and 70 are shaped to conform to portions of a sphere having its center in the center of the disc valve member 14.

A first valve stem 72 extends downwardly through the aperture 38 in the valve body 12, and is journaled therein.

A lower end portion 74 of the first valve stem 72 extends a distance into the bore 34 of the valve body 12, and a lowermost end portion 76 thereof extends into the recess 60 in the disc valve member 14. The lowermost end portion 76 of the first valve member stem 72 is shaped to have a generally hexagonally shaped cross section, and is sized to matingly fit in the hexagonally shaped portion of the recess 60 in the disc valve member 14, and thereby provide the interconnection therebetween.

The uppermost end portion 78 of the first valve stem 72 is adapted to receive and cooperate with a valve handle, or other suitable operator (not shown), for turning the first valve stem 72, and thereby rotating the disc valve member 14 from a fully open to a fully closed position. As well known in the art, various forms of valve handles and connections may be used and no further description is required.

A flange portion 80 is formed around the first valve stem 72, and is disposed generally between the uppermost end portion 78 and the lower end portion 74 thereof. The flange portion 80 has a downwardly facing surface 82, and is sized to slidingly fit in the counterbore 40 in the valve body 12. In an assembled position as shown in FIG. 1, the downwardly facing surface 82 of the flange portion 80 will engage the upwardly facing surface 42 of the counterbore 40, thereby limiting the downward movement of the first valve stem 72 in the aperture 38.

A top flange 84, having an aperture 86 extending therethrough, is secured at the top of the valve body 12, such that the first valve stem 72 is journaled in the aperture 86, and a portion of the top flange 84 adjacent the aperture 86 will engage the upper portion of the flange portion 80 of the first valve stem 72. Thus, the top flange 84 will secure the flange portion 80 in the counterbore 40 of the valve body 12, thereby securely positioning the first valve stem 72 in the valve body 12.

A second valve stem 94 is secured in the aperture 48 in the valve body 12 by a pin 95. An upper portion 96 of the second valve stem 94 extends a distance into the bore 34 of the valve body 12, and the uppermost end portion 98 of the second valve stem 94 is sized to matingly fit in the second recess 64 of the disc valve member 14.

The bore 34 and the counterbores 36 in the valve body 12 are provided to receive and cooperate with upstream and downstream seat assemblies 100 and 102, respectively. The upstream and downstream seat assemblies 100 and 102 are designed such that they may be constructed of an elastomeric type of material, or may be of a metal construction depending upon the particular application.

In a preferred form, and as shown more clearly in FIG. 2, the upstream and downstream seat assemblies 100 and 102 are of identical construction, and each includes a relatively periphery annular seat ring 104, having a valve member end 106 and a nonvalve member end 108. The seat rings 104, in a preferred form, are formed of an elastomeric material, such as Teflon or nylon. Each seat ring 104 has an inner periphery 110 and an outer periphery 112. The upstream and downstream seat assemblies 100 and 102 are adapted to be inserted axially in the bore 34 of the valve body 12, the outer periphery 112 of each ring 104 being sized to slidingly fit in the bore 34 of the valve body 12.

A sealing ring 114 is formed on a portion of the inner periphery 110 of each seat ring 104, and extends a distance radially therefrom and about the entire inner periphery 110 thereof. Each sealing ring 114 has a valve member end 116 and a nonvalve member end 118. A seating surface 120 is formed on the inner periphery of each sealing ring 114 extending between the valve member end 116 and the nonvalve member end 118 thereof. The seating surface 120 of each sealing ring 114 is sized to seatingly and sealingly engage the upstream seating surface 68 or the downstream seating surface 70 of disc valve member 14, when the disc valve member 14 is turned to the closed position as shown in FIG. 1.

A portion 128 of an aperture is formed in the upper portion of each seat ring 104 generally adjacent and intersecting the valve member end 106 thereof. A second portion 130 (shown in FIG. 1) of an aperture is formed in the lower portion of each seat ring 104, adjacent and intersecting the valve member end 106 thereof. The aperture portions 128 and 130 are sized and positioned such that in an assembled position, as shown in FIG. 1, the aperture portion 128 of the upstream seat assembly 100 and the aperture portion 128 of the upstream seat assembly 100 and the aperture portion 128 of the downstream seat assembly 102 cooperate to encompass and sealingly engage a portion of the first valve stem 72, about the entire outer periphery thereof and the aperture portion 130 of the upstream seat assembly 100 and the aperture portion 130 of the downstream seat assembly 102 cooperate to encompass and sealingly engage the second valve stem 94 about the entire outer periphery thereof.

In a preferred form and particularly when the seat rings 104 are constructed of an elastomeric or plastic-type material, the aperture portions 128 and the aperture portions 130 are formed on a slightly smaller radius than the radius of the first and second valve stems 72 and 96, respectively. Therefore, in the assembled position an interference fit and a fluidtight sealing engagement is established between the upstream and downstream seat assemblies 100 and 102 and the first and second valve stems 72 and 96.

A flange portion 132 extends radially from the outer periphery 112 of each seat ring 104 generally adjacent the nonvalve member 108 thereof. Each flange portion 132 has an outer periphery 134, a valve member end 136 and a nonvalve member end 138. The outer periphery 134 is sized to slidingly fit in the respective counterbore 36 of the valve body 12, the nonvalve member end 130 is coplanar with the nonvalve member 108 of each seat ring 104. The valve member end 136 of each flange portion 132 will engage the wall formed by the counterbore 36 in the respective end of the valve body 12 to limit the inward axial movement, and to position each seat assembly 100 or 102 in the valve body 12.

As shown in FIG. 1, the upstream seat assembly 100 is disposed in the valve body 12 generally upstream of the valve stems 72 and 94, and the downstream seat assembly 102 is disposed in the valve body 12 generally downstream of the valve stems 72 and 94. Therefore, in the assembled position as shown in FIG. 1, the upstream and downstream seat assemblies 100 and 102 are positioned to sealingly engage the disc valve member 14 at spaced upstream and downstream portions thereof, and also to sealingly engage the first valve stem 72 and the second valve stem 94.

In a preferred form, and as shown in FIG. 1, an O-ring seal member 140 is disposed in each counterbore 44 and 50, and each seal member 140 is sized to sealingly engage the first valve stem 72 or the second valve stem 94, respectively. In those applications where the seat rings 104 are constructed of a plastic or elastomeric-type material and the radii of the aperture portions 128 and 130 are slightly undersized with respect to the first and second valve stems 72 and 94, as mentioned before, the O-rings 140 merely provide a backup or a secondary-type stem seal, the primary stem seal being provided by the upstream and downstream seal assemblies 100 and 102. However, where the seat rings 104 are of a metal construction, it is apparent that an interference fit between the seat rings 104 and the first and second valve stems 72 and 94 is not desirable. Therefore, in this latter instance, the O-rings 140 provide the primary stem seal, and the seat rings 104 provide a complementary stem sealing, and also a portion 142 of each seat ring 104, generally adjacent the valve member end 106 thereof, will retain the O-rings 140 in the respective counterbores 44 or 50, and thus in sealing engagement with the respective valve stem 72 or 94.

The flanges 16 and 18 and the valve body 12 are held in an assembled relationship, as shown in FIG. 1, by a plurality of threaded bolts 144 which extend through apertures (not shown) in the flanges 16 and 18, and about the outer periphery of the valve body 12. A threaded nut 146 is disposed on each end of each of the bolts 144, and each nut 146 engages the respective flange 16 or 18.

In an assembled position, as described above, the end face 20 of the flange 16 will abut the upstream end face 30 of the valve body 12 and the nonvalve member 108 of the upstream seal assembly 100, and the end face 22 of the flange 18 will abut the downstream end face 32 of the valve body 12 and the nonvalve member end 108 of the downstream seat assembly 102. In this manner, the flanges 16 and 18 cooperate with the valve body 12 to support and secure into position the upstream and downstream seat assemblies 100 and 102 during the operation of the valve assembly 10, as will be described below.

In an assembled position as shown in FIG. 1, the seating surfaces 120 of seat rings 104 are spaced axially in the valve body 12, and are disposed generally on the opposite sides of the disc valve member 14. This axial spacing, or what is referred to as seal spacing, is designated by the reference numeral 148 in FIG. 1, and is measured axially from the nonvalve member end 118 of the upstream seal ring 114 to the nonvalve member end 118 of the downstream seal ring 114.

It is apparent from FIG. 1, that the upstream and downstream seat assembly 100 and 102 are disposed on opposite side of the first and second valve stems 72 and 94 respectively, the upstream seat assembly 100 being upstream from the valve stems 72 and 94, and the downstream seat assembly 102 being downstream of the valve stems 72 and 94. Each seal ring 114 is formed on the respective seat ring 104, such that in an assembled position each seal ring 114 is disposed in the valve body 12 at what may be referred to as a seal angle 150 with respect to the centerline axis of the valve stems 72 and 94, or in other words with respect to what may be referred to as the turning axis of the disc valve member 14. The seal angle 150 is less than 22½° for reasons to be made more apparent below.

OPERATION OF FIGS. 1 AND 2

The turning movement of the valve operator is transmitted to the disc valve member 14 via the interconnection between the first valve stem 72 and the disc valve member 14 provided by mating fit between the hexagonally shaped portion of the recess 60 and the hexagonally shaped portion 76 of the first valve stem 72. The disc valve member 14 may thus be turned from a fully open to a fully closed position, that is from a position wherein the disc valve member 14 is oriented generally in line with bore 34 through the valve body 12 to a position wherein the disc valve member 14 is oriented generally transverse to the axis of the bore 34 through the valve body 12.

When the disc valve member 14 has been turned to the closed position, as shown in FIG. 1, the seating surface 68 of the disc valve member 14 will seatingly and sealingly engage the seating surface 120 of the upstream seat assembly 100, and the seating surface 70 of the disc valve member 14 will seatingly and sealingly engage the seating surface 120 of the downstream seat assembly 102. Therefore, in the closed position, no fluid will flow through the valve assembly 10.

It is apparent from the foregoing that the disc valve assembly 10 provides upstream and downstream seals, and the fluid which may leak past the sealing engagement between the upstream seat assembly 100 and the disc valve member 14 will be effectively sealed by the sealing engagement between the downstream seal assembly 102 and the disc valve member 14. The effect of the disc valve member 14 being sealed, or rather in sealing engagement at both the upstream and downstream ends thereof, assures a more positive sealing effectiveness. This particular feature of the valve assembly 10 is referred to below as a "positive double sealing feature".

The positive double sealing feature is generally utilized in a ball-type valve, and to some extent in gate-type valves. It is chiefly for this reason that the ball-type valve is used in high pressure applications requiring a fluidtight seal.

In ball valves it has been found the optimum seal angle is 45°. In other words, using a seal angle of 45° permits the flow port area of the ball valve member to be a maximum as compared to the diameter of the ball valve member. It should also be noted that the seal angle determines the seal spacing and therefore the minimum length of the valve body.

The seal angle 150 of the disc valve assembly 10 is sized to be less than 22½° and the axial length 58 of the disc valve member 14 is sized to be less than the diameter thereof. Therefore, in the valve assembly 10, while retaining the positive double sealing feature, the seal angle 150 has been reduced, thereby reducing the length and diameter of the valve body 12 as compared to a comparable size ball-type valve. For example, in a typical ball valve having a 1½-inch diameter bore or flow port therethrough, the flow port area is approximately 1.76 square inches, and the minimum seal spacing is approximately 2 inches. In the disc assembly 10, it has been found that the same flow port area, that is 1.76 square inches, can be obtained with the seal spacing of approximately seven-eighths of 1 inch to 1 inch. In larger sizes of valves, the space savings realized is of course greater. Typically, a 12-inch diameter flow port in a ball-type valve requires a seal spacing of approximately 13 inches. To achieve the equivalent flow port area using the valve assembly 10, a seal spacing 148 of only approximately 3 inches would be required, a substantial reduction over the comparable size ball-type valve.

The seating surfaces 120 of the upstream and downstream seat assemblies 100 and 102, respectively, are spherically shaped and sized to seatingly and sealingly engage the seating surfaces 68 and 70 of the disc valve member 14, so that when the disc valve member 14 is rotated there will be a minimum interference between the outer periphery 52 of the disc valve member 14 and the upstream and downstream seat assemblies 100 and 102, respectively, thereby reducing the amount of wear.

The upstream and downstream seat assemblies 100 and 102 provide what may be referred to as full circle sealing at the respective ends of the disc valve member 14, that is, sealing surface 120 of each seat assembly 100 and 102 is in engagement with the respective seating surface 68 or 70 about an entire periphery thereof. This full circle sealing provides maximum sealing effectiveness and thus assures a fluidtight seal between the disc valve member 14 and the valve body 12.

In an assembled position, the nonvalve member end 108 of the seat assemblies 100 and 102 sealingly engages the respective end face 20 or 22 of the flanges 16 or 18, and thereby provides a fluidtight seal therebetween.

Each seat ring 104 is sized such that its axial length between the valve member end 106 and the nonvalve member end 108 thereof, is sufficiently large, so that in an assembled position the valve member end 106 of the upstream seat assembly 100 sealingly engages the valve member end 106 of the downstream seat assembly 102. In one form, the axial length of the seat ring 104 is sized such that at interference or compression-type fit is established between the valve member ends 105 and the seat rings 104. Thus, the upstream and downstream seat assemblies 100 and 102 provide complete sealing integrity and protect the valve body 12 from contact with the fluid flowing through the valve assembly 10, or at a minimum substantially reduce the amount of fluid contacting the valve body 12. This is particularly important in those applications involving the handling of corrosive fluids.

It is apparent from the foregoing, that each seat assembly 100 and 102 is adapted such that it can be economically constructed as an integral unit, and yet is capable of fulfilling the entire sealing requirements of the valve assembly 10. In other words the seat assemblies 100 and 102 cooperate with each other to provide a fluidtight seal between the flanges 16 and 18, about the outer periphery of the disc valve member 14 at both the upstream and downstream ends thereof, and about the first and second valve stems 72 and 94. The seat assemblies 100 and 102 thereby substantially reduce the amount of fluid contracting the valve body 12.

It is also apparent from the foregoing that the valve assembly 10 and more particularly, the upstream and downstream seat assemblies 100 and 102 thereof in cooperation with the disc valve member 14 provide a positive double sealing feature which is particularly useful in high pressure applications, and yet maintains the size of the valve body and the size of the disc valve member at a minimum with respect to a given flow port area, thereby resulting in a substantial material and space savings.

Figure 3:
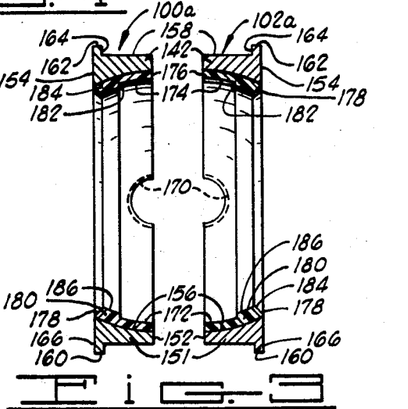
FIG. 3 is a view similar to FIG. 2, but showing modified upstream and downstream seat assemblies.
Figure 4:
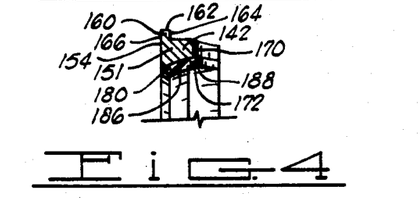
FIG. 4 is an enlarged view of a portion of one of the seat assemblies of FIG. 3, taken substantially along the lines 4-4 of FIG. 3.

EMBODIMENT OF FIGS. 3 AND 4

Shown in FIGS. 3 and 4 is a modified upstream seat assembly 100a and a modified downstream seat assembly 102a which may be used in cooperation with the valve body 12 and the disc valve member 14, shown in FIG. 1.

The upstream and downstream seat assemblies 100a and 102a are of identical construction, and each includes a rigid seat ring 151, which in a preferred form in constructed of metal or reinforced plastic-type material. Each seat ring 151 has a valve member end 152, a nonvalve member end 154, an inner periphery 156 and an outer periphery 158. The inner periphery 156 of each seat ring 151 is spherically shaped, and the outer periphery 158 of each seat ring 151 is sized to slidingly fit in the bore 34 of the valve body 12.

A flange portion 160 is formed on the outer periphery 158 of each seat ring 151, and extends radially therefrom generally adjacent the nonvalve member end 154 thereof. Each flange portion 160 has an outer periphery 162, a valve member end 164, and a nonvalve member end 166. The outer periphery 162 is sized to slidingly fit in the respective counterbore 36 of the valve body 12.

A portion 170 of an aperture is formed in the upper and lower portions of each seat ring 151 generally adjacent and intersecting the valve member end 152 thereof. The aperture portions 170 of each seat ring 151 are sized and positioned similar to the aperture portions 128 and 130 of the upstream and downstream assemblies 100 and 102, shown in FIGS. 1 and 2 (only one aperture portion 170 is shown in FIGS. 3 and 4). The aperture portions 170 in the upper and lower portions of each seat ring 151 are sized and positioned such that in an assembled position the aperture portions 170 of the upstream seat assembly 100a and the aperture portions 170 of the downstream seat assembly 102a will cooperate to encompass and slidingly engage a portion of the first and second valve stems 72 and 94, respectively, about the entire periphery thereof.

An elastomeric seal member 172 is bonded to the spherically shaped inner periphery 156 of each seal ring 151. Each elastomeric seal member 172 has an inner periphery 174, a valve member end 176 and a nonvalve member end 178. A sealing ring 180 is formed on a portion of the inner periphery 174 of each seat ring 151 generally adjacent the nonvalve member end 178 thereof. Each seal ring 180 extends a distance generally in a radial direction and has a valve member and 182, and a nonvalve member end 184. A seating and sealing surface 186 is formed on the inner periphery of each seal ring 180 extending between the valve member end 182 and the nonvalve member end 184 thereof. The seating surface 120 of each seal ring 180 is sized to seatingly and sealingly engage the upstream seating surface 68 or the downstream seating surface 70 of the disc valve member 14, when the disc valve member 14 is turned to the closed position.

In a preferred form, the valve member end 176 of each elastomeric seal member 172 is sized to extend a distance beyond the valve member end 152 of each seat ring 151. Thus, when each seat ring 151 is placed in an assembled position, that is in the position where the valve member ends 152 of the seat rings 150 abut, the valve member end 176 of one of the elastomeric seal members 172 will sealingly engage the valve member end 176 of the opposite elastomeric seal member 172.

Since each seat ring 151 is of a metal or reinforced plastic construction, it is not desirable to size the aperture portions 170 in each seat ring 151 so that an interference fit is established between the aperture portions 170 and the first and second valve stems 72 and 94 respectively. Therefore, as shown more clearly in FIG. 4, the valve member end 176 of each elastomeric seal member 172 is sized such that a portion 188 thereof extends beyond the valve member end 152 of each seat ring 151 adjacent the aperture portions 170 therein. In the assembled position, the portions 188 of each elastomeric seal member 172 will encompass and sealingly engage the first and second valve stems 72 and 94, respectively.

It is apparent from the foregoing that the salient difference between the seat rings 151, shown in FIGS. 3 and 4, and the seat rings 104, shown in FIGS. 1 and 2, is that the seat rings 150 are adapted to have a reinforced support member in lieu of an all plastic or all elastomeric-type construction. The O-rings 140 may also be used in cooperation with the seat rings 151 to provide a secondary or backup-type stem seal in much the same manner as previously described. The portion 142 of the metal or reinforced plastic seat ring 151 generally adjacent the valve member end 152 thereof will retain the O-rings 140 in the respective counterbores 44 or 50, and in sealing engagement with the first and second valve stems 92 and 94, respectively.

OPERATION OF FIGS. 3 AND 4

The upstream and downstream seat assembly 100a and 102a will operate substantially the same as the upstream and downstream seat assemblies 100 and 102, shown in FIGS. 1 and 2. The upstream and downstream seat assemblies 100a and 102a are adapted to be inserted axially into an assembled position in the valve body 12. The valve member end 164 of each flange portion 160 will cooperate with the respective counterbore 36 of the valve body 12 to limit the inward axial movement of the upstream and downstream seat assembly 100a and 102a, and to position the same in the valve body 12.

In the assembled position, the seal rings 180 are positioned on each seat ring 151 such that the seal spacing and seal angle directly correspond to the seal spacing 148 and seal angle 150 of the valve assembly 10, shown in FIG. 1. Thus, the seat ring 151 will cooperate with the disc valve member 14, and retain the advantages of the positive double sealing feature and the space saving feature described before.

As the flanges 16 and 18 are assembled to the valve body 12 as described before, each seat ring 151 is secured in a position wherein the valve member ends 152 thereof move into an abutting relationship. The valve member ends 176 of each elastomeric seal member 172 will move into sealing engagement and the portions 188 adjacent each aperture portion 170 will encompass and sealingly engage the respective valve stems 72 and 94 about the entire periphery thereof. Thus, the advantages of full circle sealing combined with a seat assembly adapted to also form the primary stem seal and to sealingly isolate the valve body 12 from the fluid flowing therethrough are retained in this embodiment of this invention.

Figure 6:
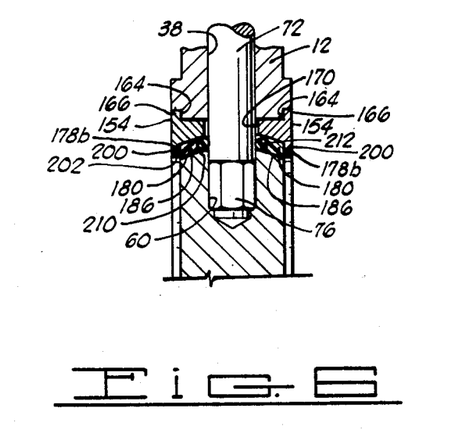
FIG. 6 is an enlarged sectional view of a portion of the seat assemblies of FIG. 5 similar to FIG. 4, but showing the seat assemblies in the assembled position.

EMBODIMENT OF FIGS. 5 AND 6

The upstream and downstream seal assemblies 100b and 102b shown in FIGS. 5 and 6, are constructed similar to the seat assemblies 100a and 102a, shown in FIGS. 3 and 4, described before. In fact, each seat ring 151b is constructed exactly like each seat ring 151, except a flange portion 200, having an inner periphery 202, a valve member end 204 and a nonvalve member end 206, is formed on the inner periphery 156b of each seat ring 151b generally adjacent the nonvalve member end 154 thereof.

The elastomeric seal member 172b is bonded to the inner periphery 156b of each seat ring 151b and is constructed exactly like the elastomeric seal member 172, shown in FIGS. 3 and 4, except as described below. The nonvalve member end 178b of each elastomeric seal member 172b is sized to abut the valve member end 204 of the respective flange portion 200, and in a preferred form is bonded thereto. The diameter formed by the inner periphery 202 of each flange portion 200 is greater than the diameter formed by the seating surface 186 so that the flange portion 200 will not protrude into the path of travel of the disc valve member 14, as it is rotated from a fully open to a fully closed position.

The valve member end 176 of each elastomeric seal member 172b generally adjacent each aperture portion 170 is formed on a greater radius than the respective aperture portion 170 thereby leaving a gap 210 between the valve member end 176 of each elastomeric seal member 172b and the valve member end 152 of each seat ring 151b adjacent each aperture portion 170. In the assembled position as partially shown in FIG. 6, an O-ring seal member 212 is disposed in each gap 210, and each O-ring seal member 212 is sized to sealingly engage the respective valve stem 72 or 94.

OPERATION OF FIGS. 5 AND 6

The seat ring 151b shown in FIGS. 5 and 6 will operate almost exactly like the seat ring 151 described before. The salient difference between the seat ring 151b and the seat ring 151 is that the flange portion 200 of each ring 151b will provide a supporting structure for each respective seal ring 180, which would be particularly desirable in high pressure applications depending on the resiliency of the elastomeric seal number 172b. Also, the O-ring seal member 212 will provide the primary stem seals by forming a fluidtight sealing engagement with the respective valve stems 72 or 94.

It is apparent that the seat rings 151b retain the advantages of the "positive double sealing feature," the full circle sealing, and the combined stem seals as described with respect to the seat rings 151 shown in FIGS. 3 and 4. In addition, the seat ring 151b provides the advantages of additional support for the portion of the elastomeric member forming the primary seal with the disc valve member 14, and the advantage of a removable, separate, and replaceable-type stem seal.

Figure 7:
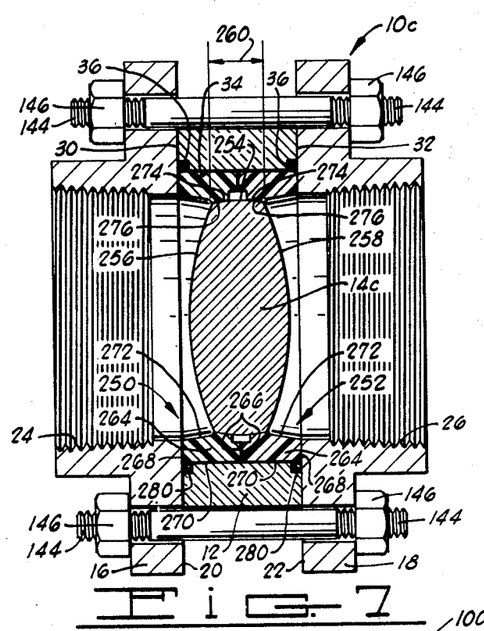
FIG. 7 is a view of the valve assembly of FIG. 1 taken substantially along the lines 7-7 of FIG. 1, and showing a modified valve member and modified upstream and downstream seat assemblies therein.
Figure 8:
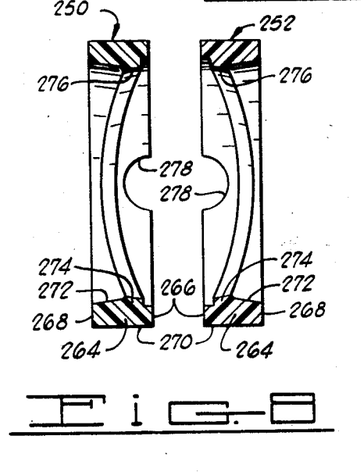
FIG. 8 is an enlarged sectional view of the upstream and downstream seat assemblies of the valve of FIG. 7, shown in a nonassembled position.

EMBODIMENT OF FIGS. 7 AND 8

The valve assembly 10c shown in FIG. 7 is constructed exactly like the valve assembly 10 shown in FIGS. 1 and 2, except the valve assembly 10c has a modified disc valve member 14c and modified upstream and downstream seat assemblies 250 and 252 respectively.

The disc valve member 14c is constructed similar to the disc valve member 14. The disc valve member 14c has an outer periphery 254 and upstream and downstream end faces 256 and 258 respectively. The upstream and downstream end faces 256 and 258 are accurately shaped, thereby making the axial length 260 of the disc valve member 14c as measured axially from the upstream end face 256 to the downstream end face 252 generally adjacent the outer periphery 254 thereof less than the axial length of the disc valve member 14c measured generally at a central portion thereof. Constructing the disc valve member 14c in this manner provides a sturdier valve member, and yet retains the axial length 260 of the disc valve member 14c at a minimum consistent with the positive double sealing feature, minimum seal angle, and minimum seal spacing described before with respect to the valve assembly 10, shown in FIGS. 1 and 2. The sturdier construction of the valve member 14c is of course particularly important in high pressure applications.

The valve member 14c has recesses (not shown) in the outer periphery thereof to accommodate and provide the inner connection between the valve stems 72 and 94 in the disc valve member 14c exactly like that shown and described with respect to the valve assembly 10 of FIGS. 1 and 2.

In a preferred form, the upstream and downstream seat assemblies 252 and 250 are constructed of an elastomeric-type material, and are identical in construction. The upstream and downstream seat assemblies 250 and 252, as shown more clearly in FIG. 8, basically comprise a seat ring 264, having a valve member end 266, and nonvalve member end 268, and outer periphery 270 and inner periphery 272.

The outer periphery 270 of each seat ring 264 is sized to slidingly fit in the bore 34 of the valve body 12. The axial length of each seat ring 264, that is, the axial length between the valve member end 266 and the nonvalve member end 268 thereof, is sized such that in an assembled position, the nonvalve member end 268 of each seat ring 264 will be coplanar with the respective end face 30 or 32 of the valve body 12, and the valve member end 266 of one of the seat rings 264 will abut and sealingly engage the valve member end 266 of the opposite seat ring 264.

A seal ring 274 is formed on the inner periphery 272 of each seat ring 264, and a seating and sealing surface 276 is formed on the inner periphery of each seal ring 274. Each seating and sealing surface 276 is shaped to seatingly and sealingly engage the outer periphery 254 of the disc valve member 14c at respective portions thereof generally adjacent the upstream end face 256 or the downstream end face 258 of the disc valve member 14c.

As clearly shown in FIGS. 7 and 8, the inner periphery 272 of each seat ring 264 is tapered such that the inner diameter of the inner periphery 272 is greater at the outer end thereof adjacent the nonvalve member end 268 of each seat ring 264. This particular construction provides additional structural support for each seal ring 274.

Aperture portions 278 are formed on each seat ring 264 in the upper and lower portions thereof. The aperture portions 268 (only one aperture portion 278 is shown in each seat ring 264 in FIG. 8) are disposed and sized exactly like the aperture portions 128 and 130 of the seat rings 104, shown in FIGS. 1 and 2, and are also provided to encompass and sealingly engage the first and second valve stems 72 and 74 when the upstream and downstream seat assemblies 250 and 252 are in the assembled position.

An O-ring seal member 280 is disposed in each counterbore 36 of the valve body 12. Each O-ring 280 is sized to sealing engage the respective end face 20 or 22 of the flanges 16 or 18, the valve body 12, and the respective seat assembly 250 or 252 thereby forming a fluidtight seal therebetween.

OPERATION OF FIGS. 7 AND 8

The disc valve assembly 10c will operate substantially the same as the disc valve assembly 10, shown in FIGS. 1 and 2. The upstream and downstream seat assemblies 250 and 252 will cooperate with the disc valve member 14c to provide a fluidtight seal therebetween and in particular each seal ring 274 is disposed on each seat ring 264 and with respect to the disc valve 14c to provide the full circle sealing and the positive double sealing feature described before with respect to this valve assembly 10.

One of the salient differences between the disc valve assembly 10c and the disc valve assembly 10 is the arcuate shape of the upstream and downstream end faces 256 and 258 of the disc valve member 14c. With this particular construction, it is possible to yet further reduce the seal spacing and yet maintain the structural integrity of the disc valve member 14c.

The upstream and downstream seat assemblies 250 and 252 are sized to not only provide the sealing integrity between the disc valve member 14c and the valve body 12 when the disc valve member 14c is rotated to the closed position, but will also provide the primary stem sealing in a manner much the same as that described before with respect to the upstream and downstream seat assemblies 100 and 102, shown in FIGS. 1 and 2.

As noted before the O-ring seal member 280 will provide the fluid tight seal between the valve body 12, the respective flanges 16 or 18 and the respective seat assemblies 250 or 252.

Figure 9:
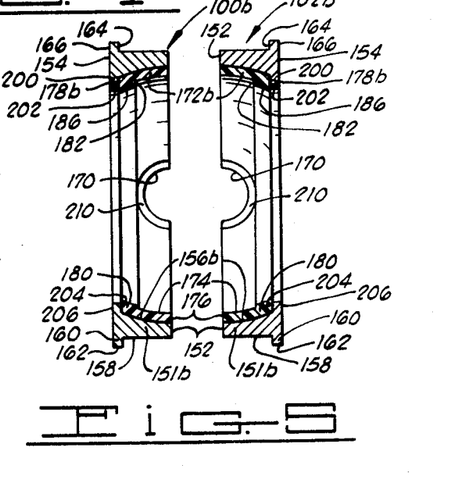
FIG. 9 is a view of the valve assembly of FIG. 1, but showing a modified disc valve member, and modified upstream and downstream seat assemblies therein.
Figure 10:
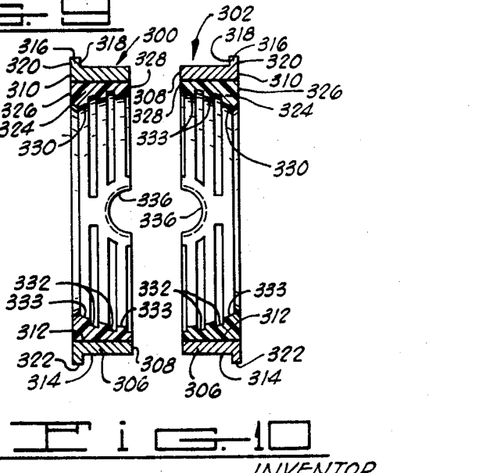
FIG. 10 is an enlarged view similar to FIG. 2, but showing the modified upstream and downstream seat assemblies of FIG. 9.

EMBODIMENTS OF FIGS. 9 AND 10

A disc valve assembly 10d shown in FIG. 9 is constructed exactly like the disc valve assembly 10, shown in FIG. 1, the salient difference being the upstream and downstream seat assemblies 300 and 302, respectively, in the disc valve assembly 10d.

The upstream and downstream seat assemblies 300 and 302, as shown more clearly in FIG. 10, are of identical construction and each includes a relatively rigid seat ring 306, which may be constructed of a metal or reinforced plastic material. Each seat ring 306 has a valve member end 308, a nonvalve member end 310, and inner periphery 312 and an outer periphery 314. The outer periphery 314 of each seat ring 306 is sized to slidingly fit in the bore 34 of the valve body 12.

A flange portion 316 is formed on the outer periphery 314 of each seat ring 306 generally adjacent the nonvalve member end 310 thereof. Each flange portion 316 extends radially from the respective seat ring 306, and has a valve member end 318, a nonvalve member end 320 and an outer periphery 322. The outer periphery 322 of each flange portion 316 is sized to slidingly fit in the counterbore 36 at the respective end of the valve body 12.

An elastomeric seal member 324 is bonded to the inner periphery 312 of each seat ring 306. The elastomeric seal member has a nonvalve member end 326, a valve member end 328, and an inner periphery 330. The inner periphery 330 of each elastomeric seal number 324 is shaped and sized to sealingly engage the outer periphery 52 of the disc valve member 140. A plurality of grooves 332 are formed in the inner periphery 330 of each elastomeric seal member 324 thereby providing a plurality of lands 333 thereabout.

Aperture portions 336 are formed in the upper and lower portions of each seat ring 306, and the aperture portions 336 are sized and positioned exactly like the aperture portions 128 and 130 of the disc valve assembly 10 to sealingly engage the first and second valve stems 72 and 94, when the upstream and downstream seat assemblies 300 and 302 are in the assembled position as shown in FIG. 9.

As shown more clearly in FIG. 10, the grooves 332 of each elastomeric seal member 324 terminate toward the aperture portions 336 therein. In one form, however, the outward grooves 332, that is the grooves 332 near the nonvalve member ends 326 of each elastomeric seal member 324 may be full circle grooves.

OPERATION OF FIGS. 9, 10 AND 11

The valve assembly 10d, and more particularly the upstream and downstream seat assemblies 300 and 302 thereof will operate similar to the valve assembly 10, described before.

When the disc valve member 14 is rotated to the closed position, the elastomeric seal member 324 of the upstream and downstream seat assemblies 300 and 302, respectively, will sealingly engage the disc valve member 14 about the outer periphery 52 thereof and provide a fluidtight seal therebetween. More particularly, each land portion 333 of each elastomeric seal member 324 will sealingly engage the outer periphery 52 of the disc valve member 14. Since a certain amount of fluid pressure will become trapped in the grooves 332 of each elastomeric seal member 324, respectively, a series of staged differential pressure seals will be established across the surface of each elastomeric seal member 324. The overall result is that each land acts as a separate seal ring cooperating with the next one to create a fluidtight seal. It should also be noted that any particles which become wedged between the outer periphery 52 of the disc valve member 14 and the seating surface, of the upstream and downstream seat assemblies 300 and 302 will fall into the grooves 332 and will be washed away during the next opening of the disc valve member 14, thereby eliminating the problem of premature wearing. It should also be noted that, since, the grooves 332 of each elastomeric seal member 324 are closed or terminate toward the aperture portions 336, any leakage past a land 333 is thereby prevented from migrating around the valve stems 72 or 94 and passing the next land 333.

The axial width 58 of the disc valve member 14 and the upstream and downstream seating surfaces 68 and 70, thereof cooperate with the upstream and downstream seat assemblies 300 and 302, respectively, to provide the positive double sealing feature, reduced seal angle and the seal spacing described before with respect to the valve assembly 10.

The upstream and downstream seat assemblies 300 and 302, respectively, are also sized to provide a fluidtight seal therebetween, and to sealingly engage the valve stems 72 and 94.

It is apparent from the foregoing that the valve assemblies described herein cooperate to provide a fluid seal therebetween and to sealingly engage the valve stems, thereby substantially reducing the amount of fluid which will contact the valve body, and yet providing seat assemblies which are quickly and easily inserted axially for repair or replacement.

Changes may be made in the construction and arrangement of the parts or elements of the various embodiments as disclosed herein, without departing from the spirit and scope of the invention.

What is claimed is:

1. A disc valve, comprising:
  a valve body having upstream and downstream end faces and a bore extending therethrough;

a first valve stem journaled in the valve body and extending at a right angle to the axis of the bore through the valve body;

an annular upstream seat, having a valve member end, a nonvalve member end, and inner and outer peripheries, being adapted to be inserted axially into the bore of the valve body and supported thereby, said upstream seat having a sealing surface formed around a portion of the inner periphery thereof upstream of the first valve stem, and an elastomeric aperture portion adjacent and intersecting the valve member end of the upstream seat, said aperture portion being sized and positioned to sealingly engage a portion of the first valve stem about a portion of the outer periphery thereof, an annular downstream seat, having a valve member end, a nonvalve member end, and inner and outer peripheries, being adapted to be inserted axially into the bore of the valve body and supported thereby, said downstream seat having a sealing surface formed around a portion of the inner periphery thereof downstream of the first valve stem, and an elastomeric aperture portion adjacent and intersecting the valve member end of the downstream seat, said last-mentioned aperture portion being sized and positioned to cooperate with the aperture portion of the upstream seat to encompass and sealingly engage a portion of the first valve stem about the outer periphery thereof, the downstream seat being sized to extend a distance into the bore of the valve body such that the valve member end thereof sealingly engages the valve member end of the upstream seat about the entire periphery thereof except where interrupted by the sealing engagement with the first valve stem;

a rigid material disc valve member in the valve body connected to the first valve stem for turning movement of the disc valve member about a turning axis, between a closed position transverse to the axis of the bore through the valve body, and an open position in line with the bore through the valve body, the axial length of said disc valve member being less than the diameter thereof, said disc valve member having seating surfaces formed on the opposite ends thereof on opposite sides of the connection of the disc valve member to the first valve stem, arranged to cooperate with the upstream and downstream seats when the disc valve member is turned to a position transverse to the axis of the bore through the valve body, both of said seating surfaces being shaped to conform to portions of a sphere having its center in the center of the disc valve member.

2. The disc valve of claim 1 wherein the valve body includes a pair of counterbores, one of the counterbores intersecting the upstream end face of the valve body and the other of said counterbores intersecting the downstream end face of the valve body; and wherein the disc valve is defined further to include an O-ring seal member disposed in each of said counterbores, each o-ring seal member being sized to sealingly engage the valve body and the outer periphery of the annular upstream or downstream seat.

3. The disc valve of claim 2 wherein the upstream seat and the downstream seat are each constructed of an elastomeric material.

4. The disc valve of claim 1 wherein the aperture portions of the upstream and downstream seats are sized on a smaller radius than the radius of the first valve stem.

5. The disc valve of claim 1 wherein the valve body includes a counterbore at each end of said bore, said counterbores being provided to receive a portion of the upstream and downstream seats, respectively, and to cooperate therewith.

6. The disc valve of claim 1 wherein the upstream and downstream seats are each defined further to include a relatively rigid seat ring having a valve member end, a nonvalve member end, an inner periphery, and an outer periphery, said outer periphery being sized to slidingly fit in the bore of the valve body; and an elastomeric seal member having a valve member end, a nonvalve member end, and an inner periphery and an outer periphery, said outer periphery being bonded to the inner periphery of said seat ring, said inner periphery having a sealing and seating surface formed about a portion thereof sized to seatingly and sealingly engage the adjacent seating surface of the disc valve member.

7. The disc valve of claim 6 wherein the valve member end of each elastomeric seal member is sized to extend axially beyond the adjacent valve member end of the respective seat ring, so that when the upstream and downstream seats are in an assembled position in the valve body, the valve member end of the elastomeric seal on the upstream seat sealingly engages the valve member end of the elastomeric seal on the downstream seat to provide a fluidtight seal therebetween.

8. The disc valve of claim 6 wherein the disc member includes an upper aperture extending through a portion thereof and intersecting the outer periphery thereof, said upper aperture having a noncircular shaped cross section; and wherein the first valve stem is defined further to include a lower portion extending a distance into the bore of the valve body, said lower portion having a noncircular shaped cross section sized to matingly fit the noncircular shaped cross section of the upper aperture, thereby providing the interconnection therebetween.

9. The disc valve of claim 8 wherein the disc member includes a lower aperture extending through a portion thereof and intersecting the outer periphery thereof, said lower aperture being radially aligned with said upper aperture; and wherein the disc valve is defined further to include a second valve stem having an upper and a lower portion, said second valve stem lower portion being secured in the valve body, and said second valve stem upper portion extending a distance into the bore in the valve body and being sized to journally extend into the lower aperture in the disc member.

10. The disc valve of claim 9 wherein the valve body includes a counterbore therein adjacent the intersection of the first valve stem with the bore in the valve body; and a counterbore therein adjacent the intersection of the second valve stem with the bore in the valve body; and wherein the disc valve is defined further to include an o-ring seal member disposed in each counterbore in the valve body, each of said o-ring seal members being sized to sealing engage the portion of the first of second valve stems, respectively, about the outer periphery thereof.

11. The disc valve member of claim 10 wherein each seat ring is sized such that a portion thereof generally adjacent the valve member end thereof engages each O-ring seal member and retains each o-ring seal member in the respective counterbore in the valve body and in sealing engagement with the first or second valve stem, respectively.

12. The disc valve of claim 9 wherein each seat ring is defined further to include an upper aperture portion adjacent and intersecting the valve member end thereof; and a lower aperture portion adjacent and intersecting the valve member end thereof; and wherein the upper aperture portion of the upstream seat and the upper aperture portion of the downstream seat are sized and positioned so that in an assembled position said upper aperture portions cooperate to encompass and sealingly engage said first valve stem; and wherein the lower aperture portion of the upstream seat and the lower aperture portion of the downstream seat are sized and positioned so that in an assembled position said lower aperture portions cooperate to encompass said second valve stem.

13. The valve assembly of claim 12 wherein a portion of the valve member end of each elastomeric seal member is sized to extend axially beyond the valve member end of each respective seal ring adjacent the upper and lower aperture portions therein, so that in an assembled position said portions of each elastomeric seal member of the upstream and downstream seats cooperate to encompass and sealing engage the first or second valve stems, respectively, about the outer peripheries thereof.

14. The valve assembly of claim 12 wherein the valve member end of each elastomeric seal member adjacent the upper and lower aperture portions of each seat ring is defined further to be formed on a larger radius than the adjacent upper or lower aperture portions, thereby providing a gap between the valve member end of each seat ring adjacent the upper and lower aperture portions therein and the valve member end of each elastomeric seal member adjacent the upper or lower aperture portions of each seat ring; and wherein the disc valve is defined further to include an O-ring seal member disposed in each of said gaps, each O-ring seal member being sized to encompass and sealingly engage the first or second valve stems.

15. The disc valve of claim 1 wherein the seating surfaces of the upstream and downstream seats are defined further to include a plurality of annular grooves extending circumferentially around the seating surfaces defining a plurality of lands therein to engage the outer periphery of the disc member.

16. A disc valve, comprising:
a valve body having upstream and downstream end faces and a bore extending therethrough;
a valve stem journaled in the valve body and extending at a right angle to the axis of the bore through the valve body;
an annular upstream seat, having a valve member end, a nonvalve member end, and inner and outer peripheries, being adapted to be inserted axially into the bore of the valve body and supported thereby, said upstream seat having a sealing surface formed around a portion of the inner periphery thereof upstream of the valve stem and an elastomeric aperture portion adjacent and intersecting the valve member end of the upstream seat, said aperture portion being sized and positioned to sealingly engage a portion of the valve stem about a portion of the outer periphery thereof;
an annular downstream seat, having a valve member end, a non valve member end, and inner and outer peripheries, being adapted to be inserted axially into the bore of the valve body and supported thereby, said downstream seat having a sealing surface formed around a portion of the inner periphery thereof, downstream of the valve stem, and an elastomeric aperture portion adjacent and intersecting the valve member end of the downstream seat, said last-mentioned aperture portion being sized and positioned to cooperate with the aperture portion of the upstream seat to encompass and sealingly engage a portion of the valve stem about the outer periphery thereof;
a rigid material disc valve member in the valve body connected to the stem for turning movement of the disc valve member about a turning axis, between a closed position transverse to the axis of the bore through the valve body, and an open position in line with the bore through the valve body, the axial length of said disc valve member being less than the diameter thereof, said disc valve member having seating surfaces formed on the opposite ends thereof on opposite sides of the connection of the disc valve member to the stem, arranged to cooperate with the upstream and downstream seats when the disc valve member is turned to a position transverse to the axis of the bore through the valve body, both of said seating surfaces being shaped to conform to portions of a sphere having its center in the center of the disc valve member.